(12) United States Patent
Chang et al.

(10) Patent No.: US 7,875,365 B2
(45) Date of Patent: Jan. 25, 2011

(54) RECORDABLE OPTICAL RECORDING MEDIA

(75) Inventors: Han Feng Chang, Taipei (TW); Pang Chi Liu, Taipei (TW); Chin Yen Yeh, Taipei (TW); Shih Hsien Ma, Taipei (TW); Minte Lin, Taipei (TW); Kuan Lan Fang, Taipei (TW); Wei Tai Tang, Taipei (TW); Don Yau Chiang, Taipei (TW)

(73) Assignee: CMC Magnetics Corporation (TW)

( * ) Notice: Subject to any disclaimer, the term of this patent is extended or adjusted under 35 U.S.C. 154(b) by 567 days.

(21) Appl. No.: 11/896,178

(22) Filed: Aug. 30, 2007

(65) Prior Publication Data

US 2008/0063848 A1 Mar. 13, 2008

(30) Foreign Application Priority Data

Aug. 30, 2006 (TW) .............................. 95131999 A

(51) Int. Cl.
*B32B 3/02* (2006.01)

(52) U.S. Cl. .................. 428/641; 428/64.4; 430/270.12
(58) Field of Classification Search ....................... None
See application file for complete search history.

(56) References Cited

U.S. PATENT DOCUMENTS

| 5,458,941 | A  | * | 10/1995 | Hintz .......................... 428/64.4 |
| 6,996,055 | B2 | * | 2/2006  | Mishima et al. ............. 369/283 |
| 2007/0009700 | A1 | * | 1/2007 | Lee ............................. 428/64.4 |
| 2007/0031632 | A1 | * | 2/2007 | Lee ............................. 428/64.4 |

* cited by examiner

*Primary Examiner*—Elizabeth Mulvaney
(74) *Attorney, Agent, or Firm*—Bacon & Thomas, PLLC

(57) ABSTRACT

An optical recording medium is provided with inorganic bi-layer films that were prepared by magnetic sputtering. A first recording layer containing an element selected from Si or Ge, and a second recording layer contacts with the first recording layer and containing a primary component selected from Ta, Ni or Mo. This optical media can record information by way of microscopic structure changing of bi-layer recording films after laser irradiation.

16 Claims, 7 Drawing Sheets

RECORDABLE OPTICAL RECORDING MEDIA

BACKGROUND OF THE INVENTION

1. Field of the Invention

The invention relates to an optical recording medium and in particular to a write-once optical recording medium having excellent high-speed recording characteristics and stability of data storage.

2. Description of the Prior Art

With the development of the Internet and increased capacity of computers, optical information recording media are desired to have a large recording capacity, recording a large amount data at high speed and can store information over a long time. Among various types of the optical recording media, the most widely used is write-once recording medium, such as compact disc recordable (CD-R) and digital versatile disc recordable (DVD-R).

Currently, the material used as the recording layer of write-once optical discs is organic dye including anthraaquinone cyanine indolizium and phthalocyanine (R. T. Young, D. Strand, J. Gonzalez-Hernadez, and S. R. Ovshinsky, Appl. Phys. Vol. 60, p. 4319, 1986; Y. Maeda, H. Andoh, I. Ikuta, and H. Minemura, J. Appl. Phys. Vol. 64, p. 1715, 1988; M. Takenaga, N. Yamada, M. K. Nishiuchi, N. Akira, T. Ohta, S. Nakamura, and T. Yamashita, J. Appl. Phys. Vol. 54, p. 5376, 1983). The information data are recorded utilizing changes in an optical characteristic caused by chemical change of the organic dye under irradiation of a laser beam.

The advantages of the organic dye are non-oxidation, low phase transmission temperature, high recording sensitivity and low cost. However, the disadvantages of the organic dye is as following:

1. It will cause large jitter values and distortion of disks due to poor conductivity.

2. It will cause poor durability due to low phase transmission temperature.

3. It will cause poor visible light absorption due to the short wavelength range absorption.

4. It will cause poor yield due to non-uniform coating for higher recording density PC substrate.

5. It will cause environment pollution due to organic solvent.

In order to improve the disadvantages of currently used organic dye with short range wavelength absorbed and non-uniform coating, it is desirable to replace organic dyes with inorganic materials as recording layer. The prior art (U.S. Pat. No. 5,252,370 and U.S. Pat. No. 5,334,433) disclose a write-once optical recording medium having a recording layer containing an inorganic compound, i.e. silver oxide or iron nitride. U.S. Pat. No. 4,477,819 and U.S. Pat. No. 5,458,941 disclose utilizing bi-layer inorganic material as recording media, and the materials therein are Ge/Al, Si/Al, GaSb/Ag.

Upon exposure to recording laser light, the microstructure of inorganic bi-layer occur changing, the recording mark were created via diffusion and mixing reaction within irradiating area. The space and recording mark cause a change of optical conditions. This enables digital data to be stored in media.

SUMMARY OF THE INVENTION

The objective of present invention is to provide a high-speed, write-once type optical recording medium that utilizes inorganic materials and has good storage reliability and high climate-resistance. The optical recording medium of the present invention is suitable for optical recording using a laser with the visible light wavelength in the range of 200 nm to 750 nm.

An optical recording medium of the present invention comprises a support substrate, bi-layer recording thin films, a light transmitting layer. Further, the bi-layer recording thin films were sandwiched in between two protective layers. The optical recording medium characterized in that the bi-layer recording films were formed by laminating first and second recording layer, upon heating via irradiation of a laser light from the side of the light transmission layer or from the side of the substrate, causes diffusion and mixing reactions. The reactions enable the formation of a recording mark based on an irreversible change in reflectance.

The first recording layer of the optical recording medium of the present invention is made of a semiconductor material that is selected from the element of Si or Ge, and combinations thereof. The second recording layer containing an element selected from the group consisting of Ni, Cr, Co, Mo, and Ta as a primary component.

In the present invention, the optical recording medium further comprises a first protective layer and a second protective layer on opposite sides of the bi-layer recording films. The materials forming the first protective layer and the second protective layer are dielectric materials, such as zinc sulfide-silicon dioxide ($ZnS$—$SiO_2$), niobium oxide ($Nb_xO_y$), tin dioxide-silicon dioxide ($SnO_2$—$SiO_2$), silicon nitride ($SiN_x$), germanium nitride ($GeN_x$), aluminum nitride ($AlN_x$), and silicon carbide ($SiC$). The thickness of the first and second protective layer is in the range of 1 nm to 300 nm. The first and second protective layer can be one of above materials or a complex layer comprising above materials.

The reflective layer is made of a metal material, for example, Al, Ag, Au, Ta, Ni, Ti, Mo, and an alloy of the foregoing metals.

Due to a metal with high melting point, such as Ni, Mo, Ta, Cr, Co, and a semiconductor as the materials of bi-layer recording films in the optical recording medium of the present invention, several advantages such as high reflectivity, high climate-resistance, applicability to high speed recording, recording using whole spectrum of the visible light, and low pollution to the environment can be achieved.

BRIEF DESCRIPTION OF THE DRAWINGS

The present invention will be described in detail with reference to the accompany drawings, in which.

DESCRIPTION OF THE PREFERRED EMBODIMENT

The invention will be described in detailed with reference to the accompanying drawing.

Figure 1A:
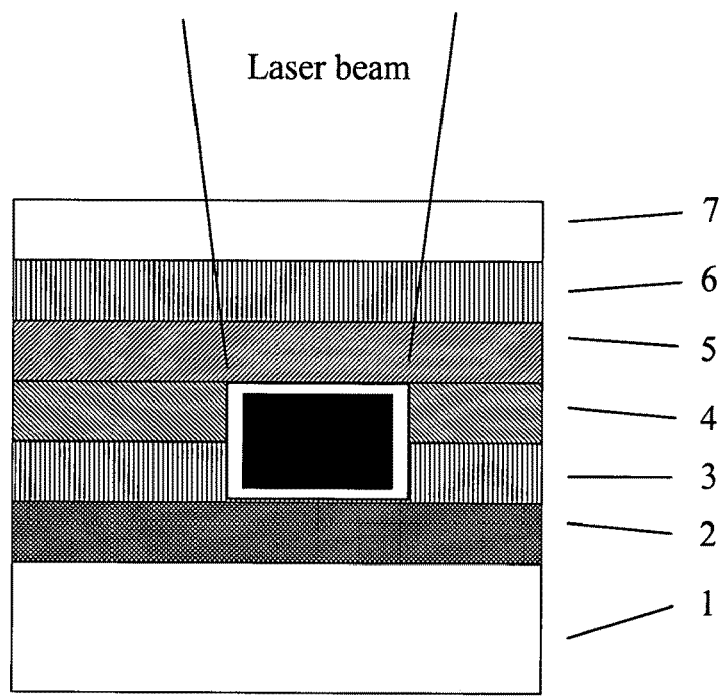
FIGS. 1A and 1B are schematic cross-sectional view showing the construction of optical recording medium of the present invention.

FIG. 1A is a schematic sectional views showing, a structure of an optical recording media of the present invention. As shown in FIG. 1A, the optical recording media of present invention comprises a substrate 1, a reflective layer 2, a first protective layer 3, a first recording layer 4, a second recording layer 5, a second protective layer 6, and a light transmitting layer 7, sequentially deposited on the substrate 1.

In this structure, the optical recording media of the present invention is configured such that the laser beam is to be irradiated thereon from the light-transmitting layer 7 side.

The substrate 1 is in the form of disc with grooves and lands on the surface. The grooves and lands function as guide tracks for recording and reproducing data. The substrate 1 is comprised of a material including, but not limited to, a glass, a polycarbonate, silicone resin, an acrylic resin, a polymethylmethacrylate, and ceramic materials.

The reflective layer 2 is made of a metal material, for example, Al, Ag, Au, Ta, Ni, Ti, Mo, and an alloy of the foregoing metals. The thickness of the reflective layer 2 is in the range of 3 nm to 200 nm.

The first protective layer 3 is formed on the reflective layer 2 and is comprised of a material including zinc sulfide-silicon dioxide ($ZnS$—$SiO_2$), niobium oxide ($Nb_xO_y$), tin dioxide-silicon dioxide ($SnO_2$—$SiO_2$), silicon nitride ($SiN_x$), germanium nitride ($GeN_x$), aluminum nitride ($AlN_x$), and silicon carbide (SiC). The thickness of the first protective layer 3 is in the range of 1 nm to 300 nm. The first protective layer can be one of above materials or a complex layer comprising above materials.

As shown in FIG. 1A, the first recording layer 4 contacts the second recording layer 5 and is made of a metal material, such as tantalum (Ta), nickel (Ni), molybdenum (Mo), or alloy containing as least one of these metals as primary components. The thickness of the first recording layer 4 is in the range of 3 nm to 50 nm.

The second recording layer 5 is made of a primary component selected from silicon (Si) or germanium (Ge). The thickness of the second recording layer 5 is in the range of 3 nm to 50 nm. The laminating first and second recording layer, upon heating via irradiation of a laser beam, is induced to for undergoing a local reaction and heat absorption to form a recorded mark with distinctive reflectivity.

The second protective layer 6 is formed on the second recording layer 5 and is comprised of a material including zinc sulfide-silicon dioxide ($ZnS$—$SiO_2$), niobium oxide ($Nb_xO_y$), tin dioxide-silicon dioxide ($SnO_2$—$SiO_2$), silicon nitride ($SiN_x$), germanium nitride ($GeN_x$), aluminum nitride ($AlN_x$), and silicon carbide (SiC). The thickness of the second protective layer 6 is in the range of 1 nm to 300 nm. The second protective layer can be one of above materials or a complex layer comprising above materials.

As shown in FIG. 1A, a light transmitting layer 7 is formed on the second protective layer 6 and is made of a ultraviolet-curing resin. The light transmitting layer 7 functions as protect the optical recording medium from moisture, dirt and oxidation. The light transmitting layer 7 has high transmittance under visible light wavelength.

Figure 1B:
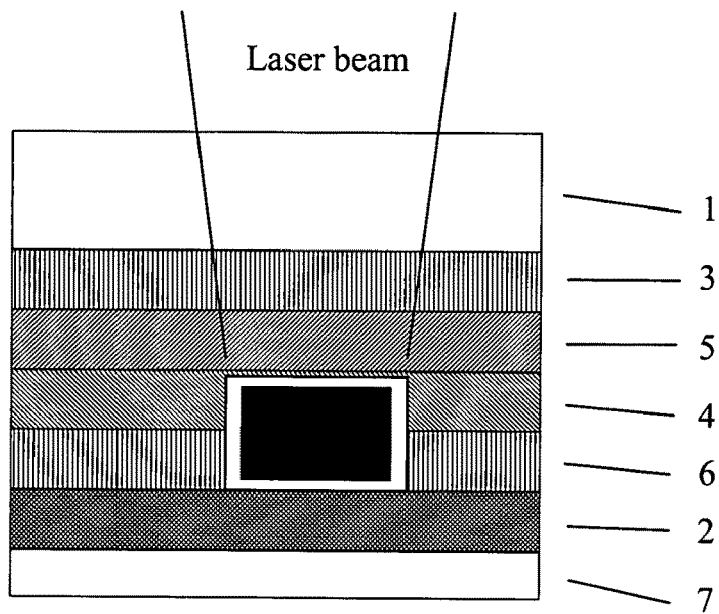

On the other hand, the structure of the optical recording media of the present invention can be for example, comprised of a substrate 1, a first protective layer 3, a second recording layer 4, a first recording layer 5, a second protective layer 6, a reflective layer 2, and a light transmitting layer 7 as shown in FIG. 1B.

To make clearer the aforementioned objectives, features, and advantages of the present invention, embodiments accompanied by figures are described in detail below.

Experiment 1, to form a disc with the structure as shown in FIG. 1A: Utilizing magnetic sputtering, a reflective layer (Ag with a thickness of 100 nm) is formed on a Blue-ray disc (BD-R) substrate that has a thickness of 1.1 mm and track pitch of 0.34 μm. Then a first protective layer ($ZnS$—$SiO_2$ with a thickness of 25 nm) formed on the surface of reflective layer, a first recording layer (Ta with a thickness of 4 nm) formed on the surface of first protective layer, a second recording layer (Si with a thickness of 6 nm) formed on the surface of the first recording layer, a second protective layer ($ZnS$—$SiO_2$ with a thickness of 25 nm) formed on the surface of second recording layer and a light transmitting layer with a thickness of 0.1 mm formed on the surface of the second protective layer, sequentially.

The thickness of the film was measured by atomic force microscope (AFM) and the optical measuring equipment (Eta-Optik). The disc made according to experiment 1 was recorded and measured by Pulstec ODU-1000 dynamic tester with 405 nm laser wavelength and 0.85 numerical aperture (NA). The writing power of the dynamic tester is in the range of 6.5 mW to 12 mW, and the recording velocities were selected to be 4.92 m/s, 9.84 m/s, 19.68 m/s corresponding to the BD-R 1×, 2×, 4× recording speed, respectively.

Figure 2:
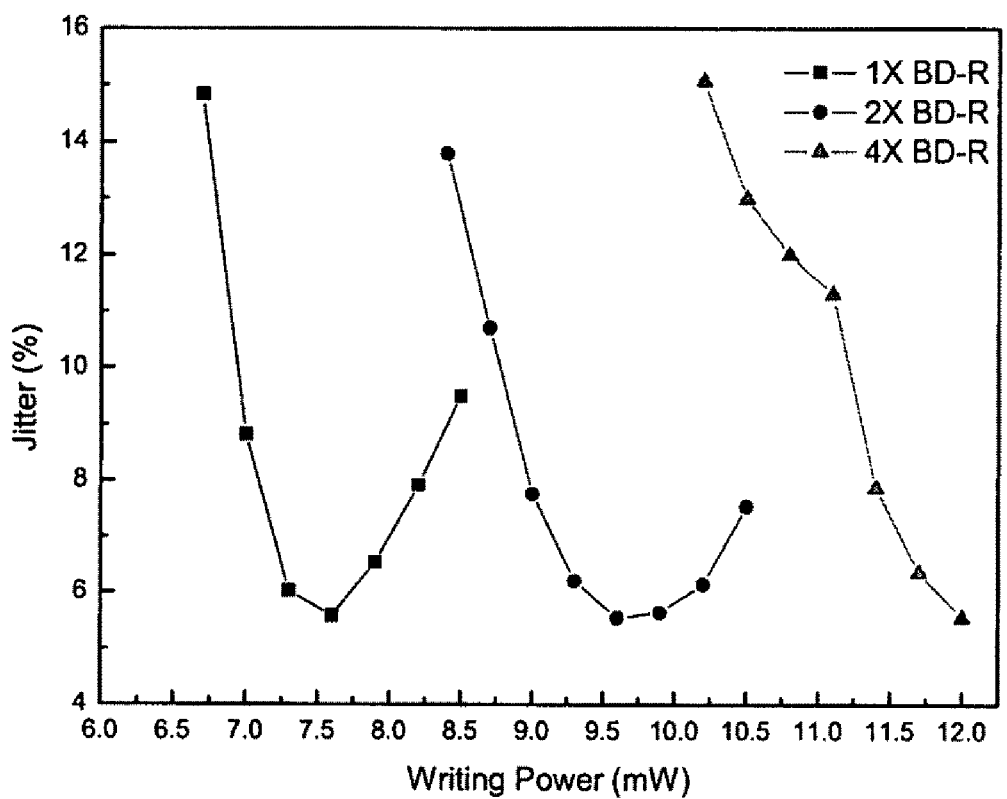
FIG. 2. is a characteristics diagram showing the relationship between the write power and jitter values of the reproduction signal, for the optical recording medium of an experiment 1 of the present invention.

FIG. 2. shows that a characteristics diagram showing the relationship between the write power and jitter values of the reproduction signal, for the optical recording medium of an experiment 1 of the present invention. At BD-R 1× recording speed, jitter value decreases from 14.9% to its lowest value about 5.6% as the writing power increases from 6.7 mW to 7.6 mW, and then rises to 9.5% as the laser power is further increased to 8.5 mw. The similar trend was showed at 2× and 4× recording speeds. We can obtain optimum recording powers from these power margins at several recording speed. By applying an appropriate writing power, the minimum bottom jitter values of less than 6.5% can be obtained from 1× to 4× recording speeds. Thus, the optical recording media of the present invention can be used since the jitter characteristic is good.

Figure 3:
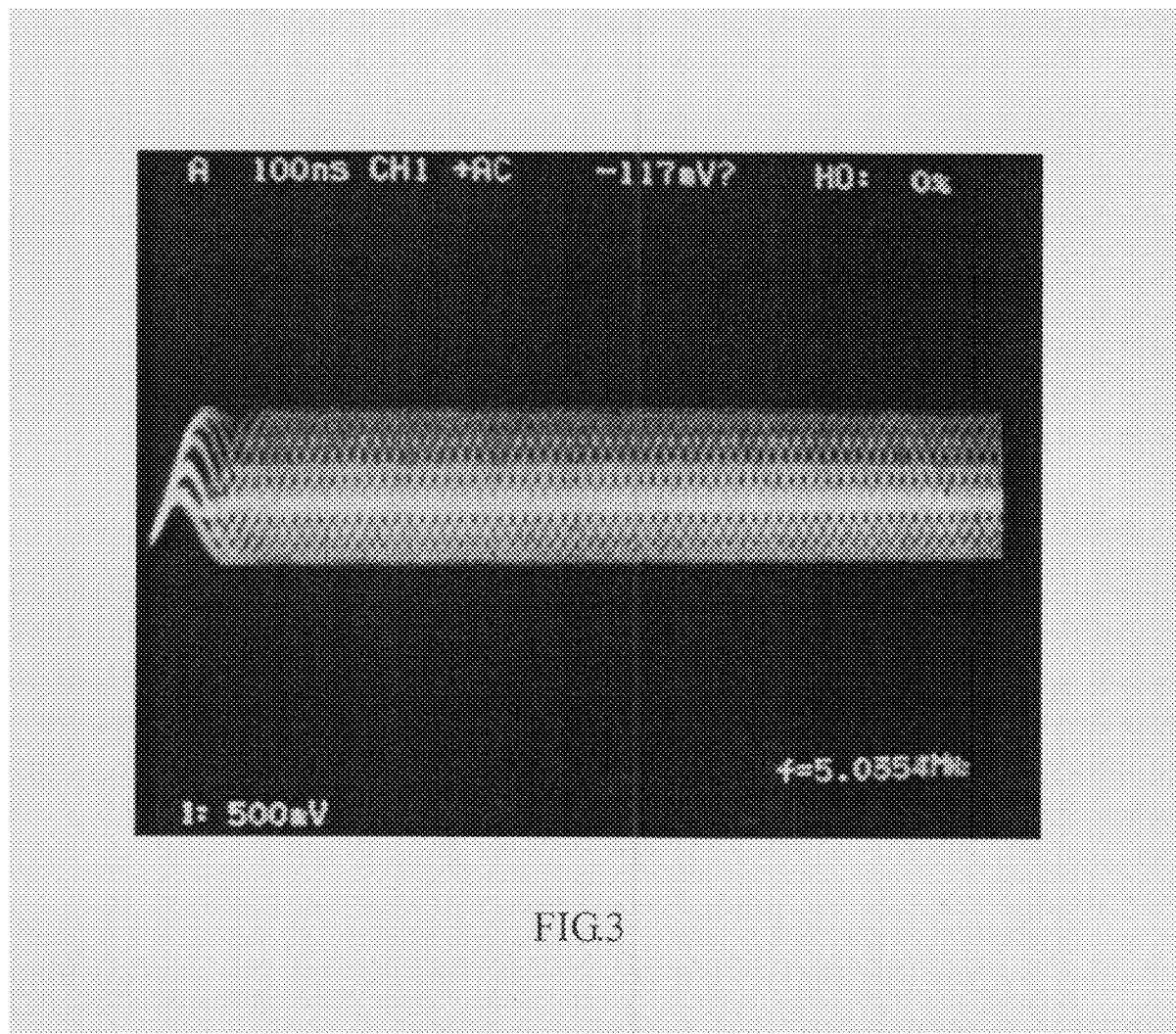
FIG. 3. is a BD 2T-8T dynamic eye pattern of a testing disc according to experiment 1 of the present invention.

FIG. 3 shows a BD 2T-8T dynamic eye pattern of a disc according to experiment 1 of the present invention at 4× recording speed corresponding with jitter value of 5.6%. Clear eye pattern can be observed.

Figure 4:
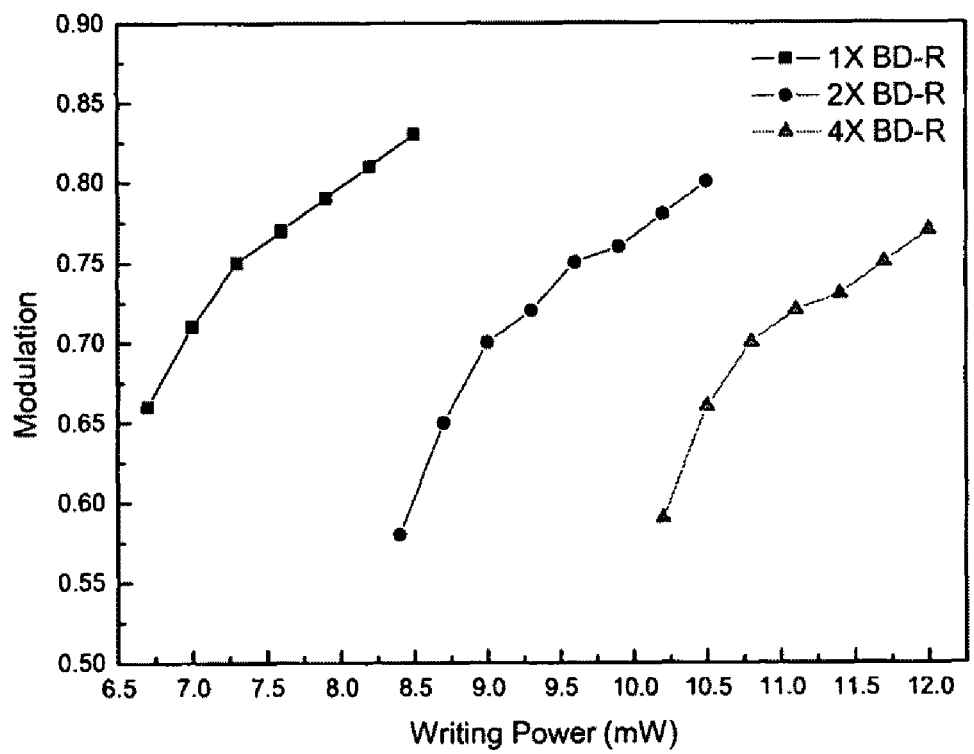
FIG. 4. is a characteristics diagram showing the relationship between the write power and modulation of the reproduction signal according to experiment 1 of the present invention.

FIG. 4 shows the modulation dependent on writing powers at different recording speeds. The modulations of test disc increase with increasing writing power. However, the modulations are over 0.4 at 1× to 4× recording speeds.

Additionally, a climate storage test was applied to evaluate the disc performance in the practical applications. The disc is recorded first and followed to the harsh environmental treatment, called archived test. The harsh experiments were conducted in the oven under 80° C. and 85% relative humidity for 250 hours, then comparing the disc jitter values before and after the archived test.

Figure 5:
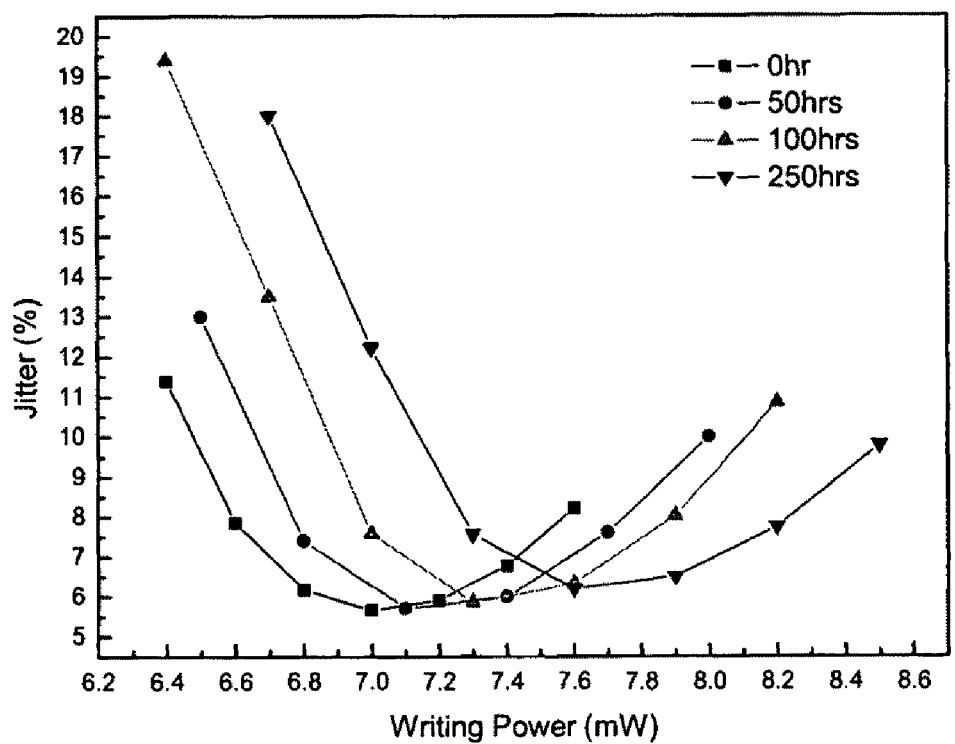
FIG. 5. is the climate test results of the testing disc under 80□ temperature and 85% relative humidity for 50, 100 and 250 hours respectively, for the optical recording medium according to experiment 1 at BD-R 1× recording speed.
Figure 6:
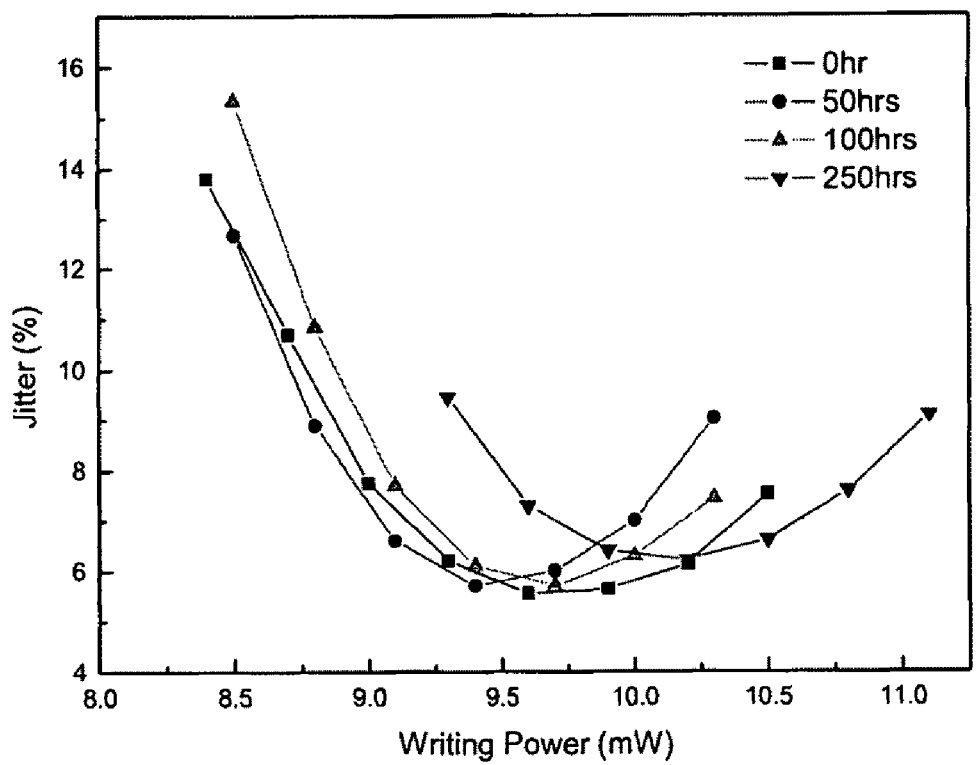
FIG. 6 is the climate test results of the testing disc under 80□ temperature and 85% relative humidity for 50, 100 and 250 hours respectively, for the optical recording medium according to experiment 1 at BD-R 2× recording speed.

The climate test results of the testing disc under 80□ temperature and 85% relative humidity for 50, 100 and 250 hours respectively, for the optical recording medium according to experiment 1 at BD-R 1× and 2× recording speed were shown in FIG. 5 and FIG. 6 respectively. The jitter values changed slightly even the disc according to experiment 1 experienced 80□ temperature and 85% relative humidity for 250 hours. It indicates the optical recording medium of present invention have good signal quality at high-speed recording and archival life stability.

Experiment 2, to form a disc with the structure as shown in FIG. 1A: Utilizing magnetic sputtering, a reflective layer (Ag with a thickness of 100 nm) is formed on a Blue-ray disc (BD-R) substrate that has a thickness of 1.1 mm and track pitch of 0.34 μm. Then a first protective layer ($ZnS—SiO_2$ with a thickness of 25 nm) formed on the surface of reflective layer, a first recording layer (Ni with a thickness of 6 nm) formed on the surface of first protective layer, a second recording layer (Si with a thickness of 6 nm) formed on the surface of the first recording layer, a second protective layer ($ZnS—SiO_2$ with a thickness of 25 nm) formed on the surface of second recording layer and a light transmitting layer with a thickness of 0.1 mm formed on the surface of the second protective layer, sequentially.

Figure 7:
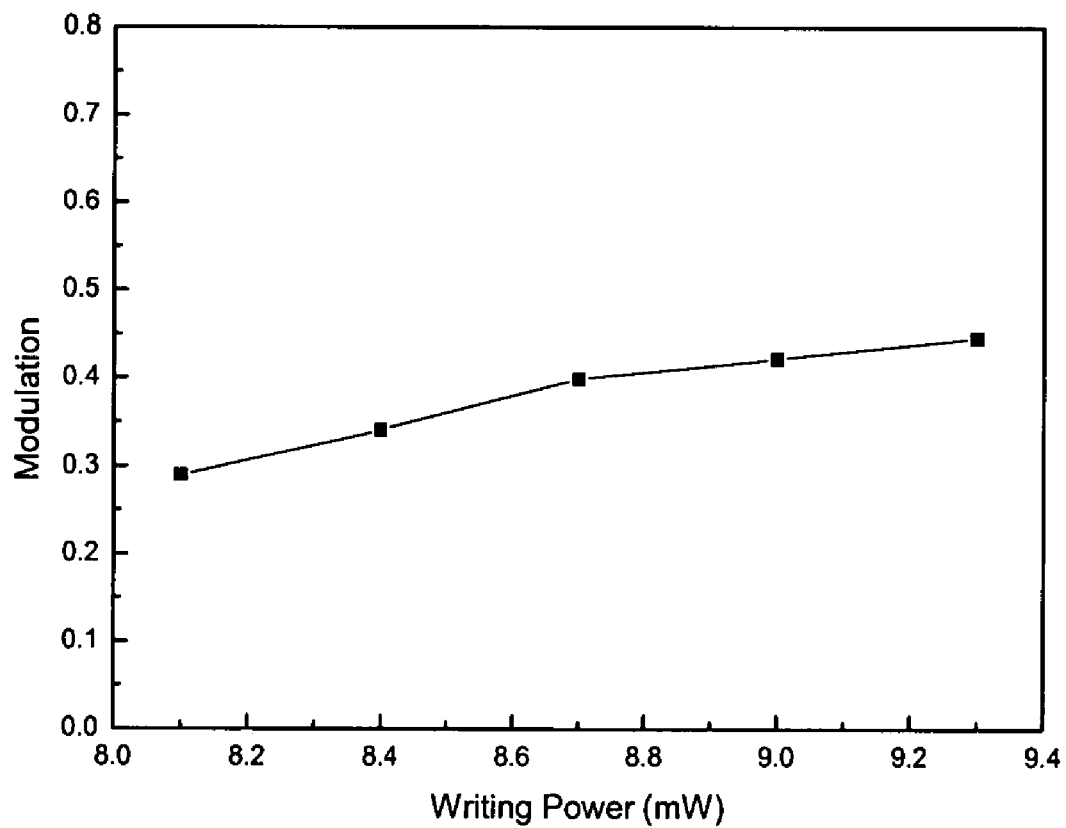
FIG. 7. is a characteristics diagram showing the relationship between the write power and modulation of the reproduction signal according to experiment 2 at BD-R 2× recording speed.

FIG. 7 shows the relationship between the write power and modulation of the reproduction signal according to the disc of experiment 2 at BD-R 2× recording speed. The modulations of test disc increase with increasing writing power. However, the modulations can exceed 0.4 by applying higher than 8.7 mW writing power. It indicates the optical recording medium according to experiment 2 can form stable recorded mark which has distinguishable reflectivity from the surrounding unrecorded regions, and thus is practically useful.

Although specific embodiments have been illustrated and described, it will be obvious to those skilled in the art that various modifications may be made without departing from what is intended to be limited solely by the appended claims.

What is claimed is:

1. An optical recording medium comprising:
   a substrate;
   a second recording layer comprising a semiconductor, wherein the semiconductor is selected from the element of Si or Ge, and combinations thereof;
   a first recording layer containing an element which is Ta as a primary component; and
   a reflective layer.

2. An optical recording medium according to claim 1, wherein a thickness of the first recording layer and the second recording is in the range of 3 nm~50 nm.

3. An optical recording medium according to claim 1, which further comprise a first protective layer and a second protective layer on opposites sides of the recording layer comprising said first and second recording layers.

4. An optical recording medium according to claim 3, wherein the first protective layer and the second protective are made of a material selected from the group consisting of zinc sulfide-silicon dioxide ($ZnS—SiO_2$), niobium oxide ($Nb_xO_y$), tin dioxide-silicon dioxide ($SnO_2—SiO_2$), silicon nitride ($SiN_x$), germanium nitride ($GeN_x$), aluminum nitride ($AlN_x$), and silicon carbide (SiC).

5. An optical recording medium according to claim 3, wherein a thickness of the first protective layer and the second protective is in the range of 1 nm~300 nm.

6. An optical recording medium according to claim 3, wherein the first protective layer and the second protective comprise a single dielectric layer or a complex dielectric layer.

7. An optical recording medium according to claim 1, wherein the reflective layer is made of a material selected from the group consisting of Au, Ag, Mo, Al, Ti, Ta, and an alloy of the foregoing metals.

8. An optical recording medium according to claim 1, which further comprises a light transmitting layer having a thickness of 10 to 600 μm on the opposite side to the substrate with respect to the recording layer.

9. An optical recording medium comprising:
   a substrate;
   a reflective layer;
   a first recording layer containing an element which is Ta as a primary component;
   a second recording layer comprising a semiconductor, wherein the semiconductor is selected from the element of Si or Ge, and combinations thereof.

10. An optical recording medium according to claim 9, wherein a thickness of the first recording layer and the second recording is in the range of 3 nm~50 nm.

11. An optical recording medium according to claim 9, which further comprise a first protective layer and a second protective layer on opposites sides of the recording layer.

12. An optical recording medium according to claim 11, wherein the first protective layer and the second protective are made of a material selected from the group consisting of zinc sulfide-silicon dioxide ($ZnS—SiO_2$), niobium oxide ($Nb_xO_y$), tin dioxide-silicon dioxide ($SnO_2—SiO_2$), silicon nitride ($SiN_x$), germanium nitride ($GeN_x$), aluminum nitride ($AlN_x$), and silicon carbide (SiC).

13. An optical recording medium according to claim 11, wherein a thickness of the first protective layer and the second protective is in the range of 1 nm~300 nm.

14. An optical recording medium according to claim 11, wherein the first protective layer and the second protective comprise a single dielectric layer or a complex dielectric layer.

15. An optical recording medium according to claim 9, wherein the reflective layer is made of a material selected from the group consisting of Au, Ag, Mo, Al, Ti, Ta, and an alloy of the foregoing metals.

16. An optical recording medium according to claim 9, which further comprises a light transmitting layer having a thickness of 10 to 600 μm on the opposite side to the substrate with respect to the recording layer.

* * * * *